H. W. LEONARD.
METHOD AND MEANS FOR CONTROLLING ELECTRIC MOTORS.
APPLICATION FILED MAR. 16, 1906. RENEWED JULY 13, 1911.

1,003,926.

Patented Sept. 19, 1911.

H. W. LEONARD.
METHOD AND MEANS FOR CONTROLLING ELECTRIC MOTORS.
APPLICATION FILED MAR. 16, 1906. RENEWED JULY 13, 1911.

1,003,926.

Patented Sept. 19, 1911.
6 SHEETS—SHEET 4.

Witnesses
L. K. Sager.
Ivan Konigsberg

H. Ward Leonard Inventor
By his Attorney C. V. Edwards

UNITED STATES PATENT OFFICE.

HARRY WARD LEONARD, OF BRONXVILLE, NEW YORK.

METHOD AND MEANS FOR CONTROLLING ELECTRIC MOTORS.

1,003,926.  Specification of Letters Patent.  Patented Sept. 19, 1911.

Application filed March 16, 1906, Serial No. 306,344. Renewed July 13, 1911. Serial No. 638,394.

*To all whom it may concern:*

Be it known that I, HARRY WARD LEONARD, a citizen of the United States, residing at Bronxville, in the county of Westchester and State of New York, have invented certain new and useful Improvements in Methods and Means for Controlling Electric Motors, of which the following is a full, clear, and exact specification.

My invention relates to methods and means for controlling electrical energy, and to various arrangements and combinations of the source or sources of energy as well as various arrangements and combinations of the devices to which the energy is supplied.

My invention is particularly applicable to the control of electric motors for the purpose of obtaining variable speeds of the driven devices.

One object of my invention is to provide an improved method and means of control in a regenerative system, such as in a railway system in which energy at certain times is restored to the source.

Another object of my invention is the provision of means whereby a large range of speed control may be obtained, and in which the consumption of energy will attain highest efficiency in the various running positions.

Another important object is to secure sufficient torque at all speeds to readily and smoothly control the load.

My invention is of most importance in connection with motors working on a common load, such as in the movement of a motor vehicle, or in train control.

My invention in the various forms of application is particularly applicable to the common forms of direct current apparatus, but is also applicable and of advantage in systems employing current of alternating, pulsating or interrupted form, or in systems in which more than one form of current is used.

My invention has various applications not referred to specifically herein, and is capable of being practiced in modes of operation and embodied in constructions which may differ widely from each other. I am therefore limited in the scope thereof only as indicated by the appended claims.

My invention will be understood from the following description read in connection with the accompanying drawings.

Figure 1:
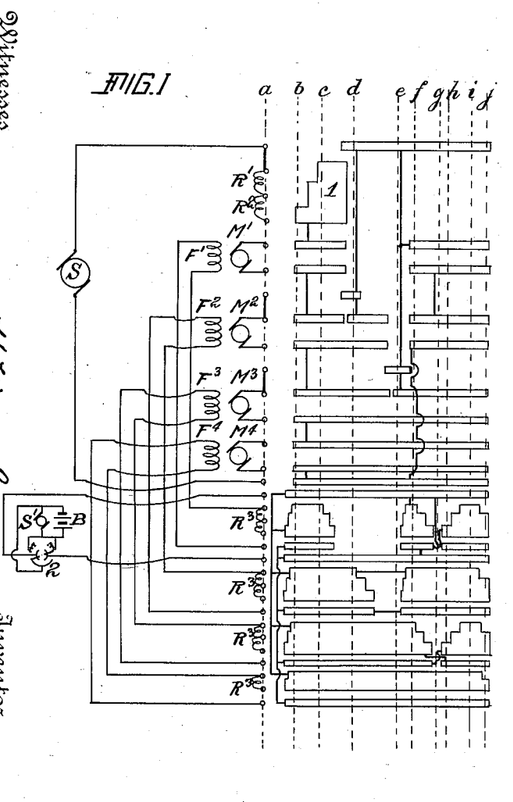
Figure 1 is a diagram of the development of a controller, also showing connections of the apparatus embodying one form of my invention in which four motors working upon a common load are controlled.

Referring to Fig. 1, a source of constant electromotive force is indicated at S, and the four armatures of the motors to be controlled are indicated at $M^1$, $M^2$, $M^3$ and $M^4$. The field windings for these armatures are indicated respectively at $F^1$, $F^2$, $F^3$, and $F^4$. Steps of starting resistance are indicated at $R^1$, $R^2$. A source of electrical energy is also indicated at $S^1$, which may be in the form of a separate exciter driven in any desirable manner for supplying energy to the fields of the motors above referred to. It will be desirable when the invention is applied to train control for example, to use in conjunction with the source $S^1$, a storage battery B, connected in parallel with the source $S^1$. With this arrangement the field excitation will be independent of the line supply, as well as lights, signals and other devices which may be connected to the auxiliary source. Also by using a separate exciter for the field control the electromotive force may be made comparatively low so as to utilize field windings of comparatively few turns and having large amperage. Connections from the apparatus above referred to are made to a series of contacts on line $a$, which correspond to the fixed contacts or fingers commonly used in electric controllers. To these contacts are also connected as shown, various steps of resistances $R^3$ for the control of the current in the field circuits of the motor. The right hand portion of the figure represents the development of the controller drum, and it will be understood that as the drum is turned to successive positions, the contacts on line $a$ will make contact with the conducting parts on the drum so as to obtain the various electric connections desired. When contact is made on line $b$, the connections will be as follows:—From one terminal of source S, connection will be made through the resistances $R^1$, $R^2$, to contact 1 on the drum and to another contact on the drum, then through motor armature $M^1$, and then by the connection of the drum contacts and fingers connection will be made successively through motor armatures $M^2$, $M^3$, $M^4$ and back to the other terminal of the source S. The motor armatures and starting resistance are thus all connected in series across the source in the initial position. It will also be seen that the fields of the motors are given their full strength, current passing from the source $S^1$ to certain of the drum contacts, then through the motor field winding and through other contacts back to the source, the resistances $R^3$ being short circuited. A large starting torque is thus obtained and at low speed. It will be noted that the drum contacts for the field connections extend to the left of line $b$, a little beyond the contacts for the motor connections. The object of this is to avoid deënergizing the fields each time the controller is brought near the off-position, and in position for stopping the motors, which arrangement will be of advantage in instances where frequent starting and stopping is necessary. The field circuits may then be interrupted by the usual main cut out switches or by bringing the controller to the open circuit position. Movement of the controller will next cut out section $R^2$ of the starting resistance, and further movement will cause section $R^1$ of the starting resistance to be cut out or short circuited so that in position $c$ all of the starting resistance will be cut out giving a desirable running position. It will be understood that any number of steps of starting resistance may be used as desired. It will be noted that the field circuits are opened and closed with the resistances $R^3$ in circuit and that these resistances are gradually cut in and out, not only at these first positions, but also at other intermediate positions of the controller. With this arrangement the sparking at the field contacts will be reduced over that which would take place if the circuits were interrupted with full field strength. Upon further movement of the controller, the field $F^1$, will be gradually weakened by the insertion of its resistance $R^3$ in the field circuit, and finally the field circuit is opened. This reduces the counter-electromotive force of armature $M^1$ and thus gradually increases the electromotive force applied to the three remaining motor armatures with corresponding increase in the speed. In position $d$, these three motor armatures are connected in series across the main source, but before armature $M^1$ is cut out of circuit and after its field circuit is opened, armature $M^1$ will be short circuited by a connection from the source through drum contacts to a terminal of armature $M^2$ as shown. Opening of the main circuit with consequent sparking is thus avoided. As the controller is moved beyond position $d$, the field of motor armature $M^2$ will be gradually weakened by the insertion of resistance $R^3$ in its field circuit, which circuit is afterward opened as referred to with reference to the field of motor armature $M^1$. The counter-electromotive force of armature $M^2$ is thus reduced, resulting in an increase of electromotive force applied to the remaining two armatures $M^3$, $M^4$. In position $e$, the armatures $M^3$, $M^4$ are connected in series directly across the main source and the speed is correspondingly increased. In passing to this position, armature $M^2$ is first short circuited by a direct connection to line, as explained with reference to armature $M^1$, and opening of the circuit is thus avoided. Further movement of the controller causes the fields $F^1$, $F^2$ to be excited at their full strength, and in position $f$, the motor armatures $M^1$, $M^2$ will be connected in series across the main source and in parallel with the series connection of armatures $M^3$, $M^4$. The next effect of moving the controller, is the weakening of the fields F¹, F³ by the insertion of resistances in the field circuits, thus resulting in the reduction of counter electromotive force of the armatures M¹, M³, and resulting in a gradual increase of electromotive force upon the terminals of armatures M², M⁴ with corresponding increasing speed. On line $g$, the circuit of fields F¹, F³ are opened so that the armatures M², M⁴ receive substantially the full electromotive force of the source upon their terminals, since they are connected in parallel across the source by each having in circuit another motor armature which is rotating idly. The remaining connections secured by the controller are such, that a considerably greater electromotive force is applied to the armatures M², M⁴ than that received from the main source. This is accomplished by causing the motor armatures M¹, M³, which have previously been acting as propelling motors working on the common load, to now act as generators being driven by the load and supplying the energy generated to the remaining two armatures M² and M⁴ which continue to act as propelling motors. It will be seen that in position $h$, the fields F¹, F³ are reversed by current passing through these field circuits in the reversed direction, and also that resistances R³, are inserted in these field circuits. This gives a weak reversed field, and as the armatures M¹, and M³ continue to rotate in the same direction, and as the armature connections remain unchanged, these armatures will generate an electromotive force in the same direction as that of the main source S so that the resultant electromotive force applied to the armatures M², M⁴ will equal respectively that of the source plus that generated by armatures M¹, M³ in their weakened fields. This increase of electromotive force at the terminals of armatures M², M⁴ results in the corresponding increase in speed. As the controller is moved to additional new positions, the resistances R³ of the field circuits F¹, F³ are gradually short circuited, which results in a strengthening of these fields and an increase of electromotive force generated by armatures M¹, M³ with corresponding increase in electromotive force which is applied to armatures M², M⁴. Thus, at position $i$, armatures M¹, M² are generating their full electromotive force, and that applied to the armatures M², M⁴ is a maximum. In position $j$, the strength of the four fields F¹, F², F³, F⁴, is weakened, giving a further increase in speed. The increase in speed resulting from the weakening of all these fields is less than that which would be obtained if only the fields F², F⁴ of the working motors were weakened, since the latter condition would result in an increased electromotive force generated by the armatures M¹, M³, by reason of the increased speed, and this increase in electromotive force generated will cause a still further increase in speed which might be too great in some instances, and more than the motors would stand. By weakening the fields F¹, F³ as above referred to, the electromotive force generated by the armatures M¹, M³ remain substantially constant. It will be understood that when the controller is moved back to the initial position, the connections will be made in the reverse order and the speed gradually reduced. In this retarding of the load, however, the motors will act as generators and supply energy through the mains to the source, or for consumption in other parts of the system, and the rapidity with which the moving load is brought to rest and the amount of energy restored to the line at any instant will depend upon the movement of the controller. Although any means for reversing the direction of movement of the load may be used, for example, such as reversing the connections of the motor armatures by providing the usual form of reversing switch, I prefer to reverse by reversing the connections from the source S¹, as by switch 2, which will cause the reversal of direction of current through the fields of the motors, and, consequently, reverse the direction of rotation of the motors. This reversing switch will be preferably interlocked with the main controlling switch in the usual manner so that the reversing switch 2 can be moved only when the main controlling switch is in the off-position.

Figure 2:
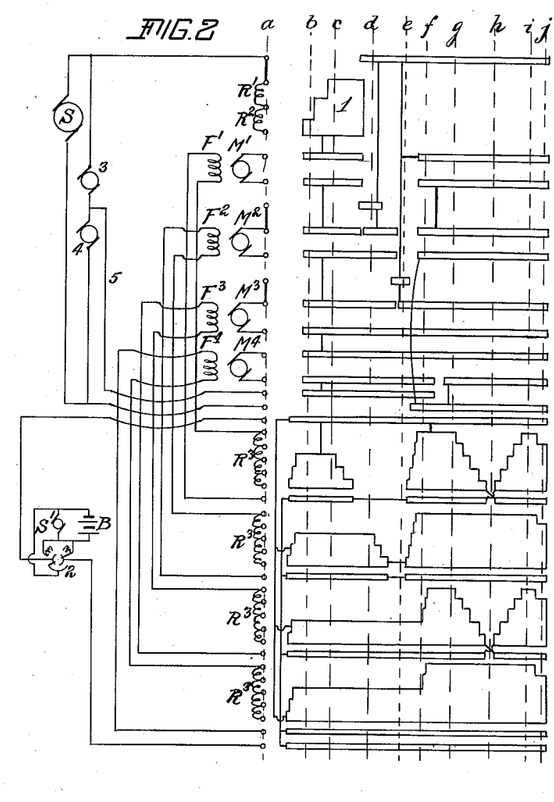
Fig. 2 is a similar diagram of another form of my invention which embodies a three wire source of supply in which the potential of the intermediate wire is substantially midway between the potential of the outside supply wires.

In the form of invention shown in Fig. 2, a three-wire source is used and the motors are combined in various relationships with each other and with the three-wire source so as to obtain low speeds with large starting torque and gradually increase to high speeds with a reduced torque. The parts lettered similarly to those in Fig. 1, designate the same elements. Across the source S is connected a balancer comprising two armatures 3, 4, and from their common point of connection extends the intermediate wire 5. In this construction, it will be assumed that the electromotive force of the armatures 3, 4 are equal, and that they act in the usual manner to maintain the potential of the wire 5 mid-way between that of the outside wires from the source S. It will be seen by following through the connections, that in position $b$ of this Fig. 2, the starting resistances and motor armatures will be connected in series across the source 3. It will also be seen that the fields of the motors are given a certain strength, but not their full strength as some resistance is in the circuit of each field winding. The electromotive force to which each motor armature is subjected will be low by reason of the series connection, and the low electromotive force of the source 3. In position c, the starting resistance is removed from the armature circuit as previously referred to in connection with Fig. 1. As the controller is moved farther, the field of armature $M^1$ is gradually reduced, and in position d, armature $M^1$ is removed from the circuit. Movement of the controller afterward, gradually weakens the field of motor $M^2$, and in position e, armature $M^2$ is removed from circuit and the armatures $M^3$, $M^4$ then receive the full electromotive force between one of the outside supply mains and the intermediate mains. Further movement of the controller causes the fields of motor armatures $M^1$, $M^2$ to be energized to their full strength, the resistances in their field circuit being short circuited, and this increase in field strength is sufficient at the speed of operation, to cause the total electromotive force of armatures $M^1$, $M^2$ to almost equal that of the source S; thus, in position f, in which the armatures $M^1$, $M^2$ are connected in series across the source S, the motors $M^1$, $M^2$ will share the load with the motors $M^3$, $M^4$ which are then connected across the supply mains of lower electromotive force. Continued movement of the controller will cause the strengthening of the fields of armatures $M^3$, $M^4$, and this will throw the load from these armatures onto the other two armatures and the connection of armatures $M^3$, $M^4$ between one outside main and the intermediate main will afterward be interrupted, and in position g, the armatures $M^3$, $M^4$ will be connected in series across the source S, and in parallel with the series connection of motor armatures $M^1$, $M^2$ across the same source. Each of the four motors will now carry its share of the load, and the speed will correspond to that obtained by subjecting the two series connections of two motors to the electromotive force source S when the motors have their full field strength. The effect of now moving the controller is to gradually weaken the fields of armatures $M^1$, $M^3$ by inserting resistances in their field circuits, and in position h these field circuits are opened and armatures $M^2$, $M^4$ receive the full electromotive force of the source S, the armatures $M^1$, $M^3$ then rotating idly. Movement of the controller then reverses the fields of armatures $M^1$, $M^3$, and their field strength is afterward gradually increased by the short circuiting of the resistances $R^3$ in the field circuits of these armatures. This results, as explained with reference to Fig. 1 in causing the armatures $M^1$, $M^3$ to generate an electromotive force in the same direction as that of the source, and consequently to gradually increase the electromotive force applied to the armatures $M^2$, $M^4$, which continue to act as motors to propel the load at a considerable increase in speed. In position i, the armatures $M^1$, $M^3$ are generating their full electromotive force which together with that of the source S is applied to armatures $M^2$, $M^4$. In position j, the strength of all the fields $F^1$, $F^2$, $F^3$, $F^4$, is weakened resulting in a further increase in speed as referred to previously in connection with Fig. 1.

Figure 3:
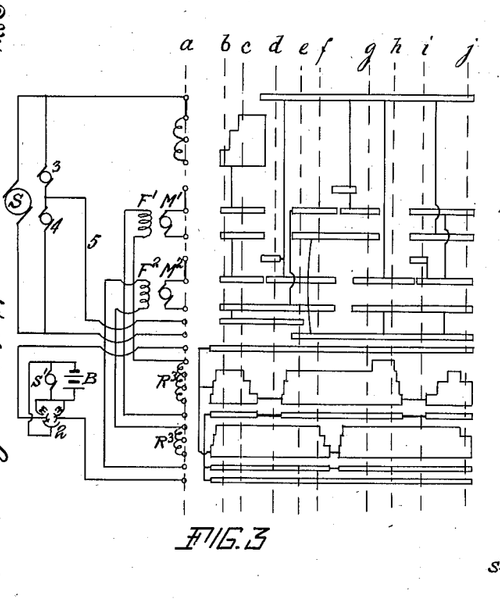
Fig. 3 is a diagram of similar form showing another form of my invention, and in which two motors working on a common load are controlled from a three-wire supply, such as referred to in connection with Fig. 2.

In Fig. 3, a two motor equipment is indicated, and the sources of energy used are the same as those referred to with reference to Fig. 2. In Fig. 3 the sequence of connections are as follows:—In position b, the armatures $M^1$, $M^2$ and starting resistances $R^1$, $R^2$ are connected in series across the comparatively low electromotive force source 3, and the fields of the motors are made strong. In position c, all of the starting resistance is cut out of circuit. After the strength of the field of armature $M^1$ is gradually reduced, and armature $M^2$ receives substantially the full electromotive force of the source 3, armature $M^1$ is removed from its series connection with armature $M^2$, and in position d, it will be seen that armature $M^2$ is connected directly across the source 3. The field of armature $M^1$ is next restored to its former strength, and armature $M^1$ is then connected across source 4, as shown in position e. In position f, the connection of the armatures $M^1$, $M^2$ to the intermediate wire 5 is broken, which leaves the two motor armatures connected in series across the source S, and they then receive double the electromotive force that they did in position c, when they were connected in series across one outside wire and the intermediate wire. The field strength of armature $M^2$ is next gradually reduced, which correspondingly reduces the counter electromotive force of this armature and resulting in a gradual increase of electromotive force upon the terminals of armature $M^1$. In position g, both armatures are connected in parallel across the source S, each taking its share of the load. The load carried by armature $M^1$ is next removed by strengthening the field $F^1$ by the cutting out of more resistance in the circuit of this field winding, and in position h, armature $M^1$ is removed from circuit. In position i, armatures $M^1$ and $M^2$ are again connected in series across source S, but the connection of armature $M^1$ is reversed with reference to the previous series connection across source S, and current flows through this armature $M^1$ in a reversed sense. In position i, the field $F^1$ has little or no substantial strength, but as the controller is moved, the resistance in this field will be gradually short circuited, and the strength of the field correspondingly increased. As the connection of armature $M^1$ is reversed, the gradual building up of its field in the same direction as before, will cause the electromotive force generated by M¹ to be in the same direction as the source, and the electromotive force applied to armature M² will therefore be gradually increased. In position $j$, the strength of the motor fields is weakened to give further increase in speed.

Figure 4:
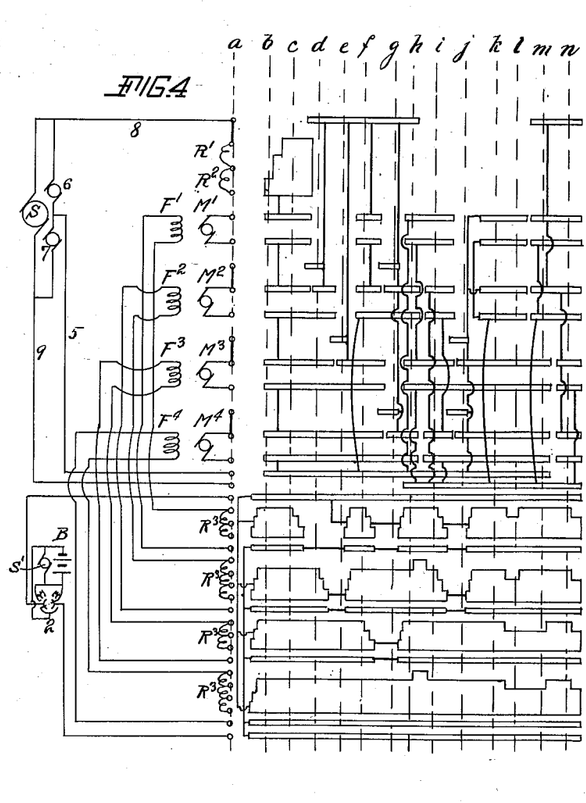
Fig. 4 is a diagram of another embodiment of my invention and in which four motors are controlled from a three-wire supply, in which the potential of the intermediate wire is nearer that of one of the outside mains than the other.
Figure 14:
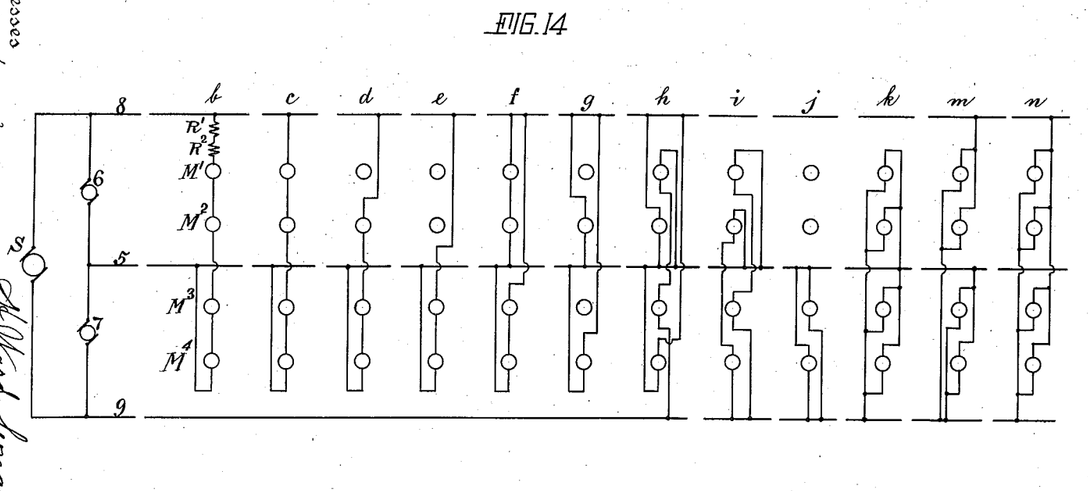
Fig. 14 is a diagram showing certain connections of the motor armatures secured by the operation of the controlling switch of Fig. 4.

In Fig. 4, the control of four motors is shown, and a three wire source of energy is utilized, but instead of having the electromotive force between the intermediate main and each of the outside mains equal, the electromotive force of 6, or that between intermediate main 5 and outside main 8 is made relatively low, and that of source 7 or between intermediate main 5 and outside main 9, is comparatively high. A desirable ratio which is assumed in the present instance, is that between intermediate mains 5 and 8 has 100, that between mains 5 and 9 has 200, and that between mains 8 and 9 has 300. Fig. 14 illustrates in diagram the connections of the motor armatures secured by the controlling switch of Fig. 4 in positions correspondingly lettered in the two figures. In position $b$, the motor armatures and starting resistances are in series across the mains 5 and 8, thus receiving the lowest electromotive force. In position $c$, the starting resistance is short circuited. In position $d$, the armature M¹ has been removed from circuit, after first gradually reducing its field strength and after being short circuited. In position $e$, armature M² is also similarly removed from circuit, leaving armatures M³ and M⁴ in series across the mains 8, 5. In position $f$, armatures M¹, M² are also connected in series across the mains 8, 5 and their fields are of such strength that they carry their share of the load together with armatures M³, M⁴. Movement of the controller now gradually weakens the fields of armatures M¹, M³, which results in a gradual increase of electromotive force upon armatures M², M⁴, and in position $g$, armatures M², M⁴ are in parallel across mains 8, 5 and receive the full electromotive force of source 6. In position $h$, the fields of armatures M¹, M³ have been given their normal full strength, and these armatures are then connected in series with each other across the mains 5, 9 of double the electromotive force that exists between the mains 8, 5. Each armature is then carrying its share of the load, and it will be seen that with the same field strength for all the motors, the speed of each motor would correspond. In passing from position $h$, the fields of armatures M², M⁴ will be strengthened and thereby removing their load, and in position $i$, armatures M², M⁴ are also connected in series across the mains 5, 9, and the field strength of all the motors is the same. The speed of the motors in position $i$, would be the same as that in position $h$, but as the controller is moved farther, the fields of armatures M¹, M² are gradually weakened, which results in a gradual increase of electromotive force upon the armatures M³, M⁴, and in position $j$, armatures M¹, M² are removed from circuit, and armatures M³, M⁴ are in parallel with each other directly across the mains 5, 9, or source 7. In position $k$, all of the motor armatures are connected in parallel with each other across the mains 5, 9 and each have the same field strength. Each motor therefore carries its share of the load and the speed will correspond to that obtained by subjecting each motor to the electromotive force of the source 7, which is double that of source 6. In position $l$, the fields of all the motors are weakened, giving further increase in speed. In passing to position $m$, the load is first removed from armatures M¹, M² by strengthening their fields, and these armatures are then disconnected from circuit, and in position $m$, are connected in parallel across the outside mains 8, 9, or the high potential source S. In this position each motor will carry its share of the load, even though the armatures M¹, M² are connected across a source of higher electromotive force, since the amount of resistance in the field circuits F¹, F² would be proportionally less than that in the field circuits of the other two motors, and thus give substantially the same speed. In position $n$, all of the motor armatures are connected in parallel across the mains 8, 9 of highest electromotive force, and the strength of their fields is the normal full strength and of equal value. Further movement of the controller gives corresponding increase in speed by weakening the field strength of all the motors as desired.

Figure 5:
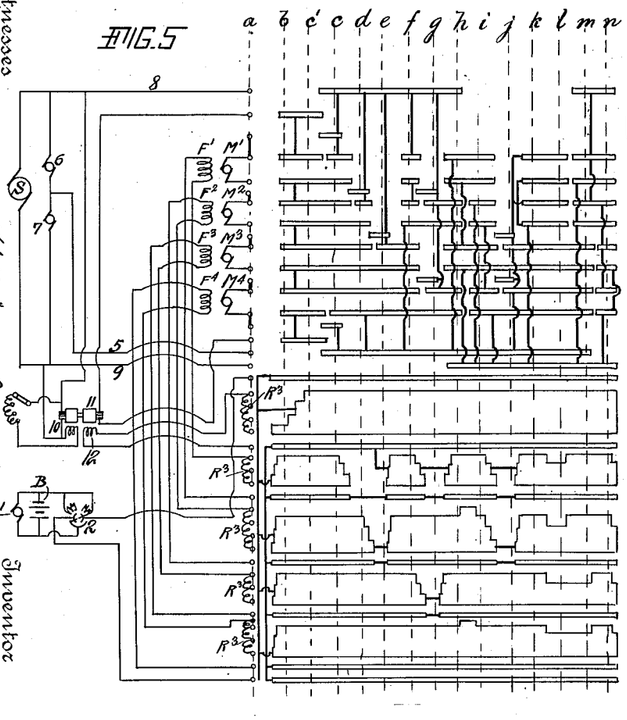
Fig. 5 is a diagram similar to that of Fig. 4, except that in the starting position a variable source of energy is used for gradually increasing the speed of the motors, instead of using starting resistances as in the form of Fig. 4.

In Fig. 5, the motors are controlled in the starting positions, and while operating on low speeds by direct control of the electromotive force applied to the motors, and the use of starting resistances in the motor circuit is avoided. After passing through the positions for obtaining the low speeds, the motors are afterward interconnected and combined with the supply mains of different potential, and the fields of the motors controlled so as to obtain the smooth control of speed within wide limits as has already been described. In Fig. 5 is shown a motor 10 driving the generator armature 11. The field of the motor 10 is shown adjustable so as to vary its speed as may be desired. The field circuit 12 for armature 11 is shown extending to contacts of the controlling switch, and to resistance sections R³. In the initial position when the fingers make contact on line $b$, the motor armatures are in series with each other and with the armature 11. The fields of the motors have their full strength, but the field strength of generating armature 11 is low, since all of the resistance R³ of the field circuit 12 is in series therewith. The application of this low electromotive force secures an easy starting, and with the required large torque. Movement of the controller beyond the position $b$, causes the gradual short circuiting of the resistances in the field 12, and the strengthening of this field results in a gradual increase of electromotive force applied to the motor armatures until at position $c^1$, the motors in series will receive the full electromotive force of armature 11. In position $c$, the motor armatures although still connected in series, have been disconnected from the armature 11 and are then connected in series across the mains 8, 5, thus receiving directly the electromotive force of the source 6 and operating at a speed corresponding to this electromotive force. The position $c$ in this figure corresponds to the position $c$ in Fig. 4, and the subsequent connections of Fig. 4 are repeated in Fig. 5 with like results, and therefore need not be again considered. It will be noted that in passing from position $c^1$ to position $c$, there is an intermediate connection during which the motor armatures are connected across source 11 and also source 6, the electromotive forces of these sources being equal at that time. There is therefore no interruption of the motor circuit. It will, of course, be understood that when the controller is turned back to the initial position, the connections will be made in a reverse sense and that the load may be retarded by restoring energy to the line as above referred to.

Figure 6:
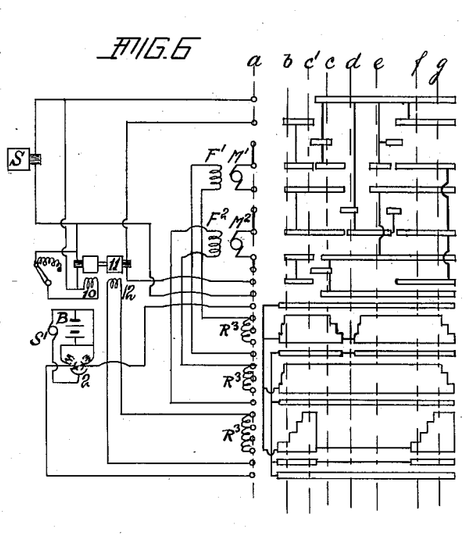
Fig. 6 is a diagram of another form of my invention in which a two-wire supply is used, and also a source of variable electromotive force in connection with securing certain of the running positions.

In Fig. 6, the control of two motors is illustrated, and with the constant electromotive force source S is combined the variable source of electromotive force, having the armature 11 and field 12 of the nature referred to with reference to Fig. 5, the armature 11 being driven by the motor 10. In this form of my invention, however, the variable electromotive force derived from armature 11 is made use of in other operating positions than in the low speed positions only. In the starting position $b$, the armatures $M^1$, $M^2$ are connected in series with the armature 11 and receive the low electromotive force which is generated thereby. The motor fields have their full strength, and as the controller is moved, the field 12 is strengthened by the short circuiting of its resistances $R^3$, and at position $c^1$, the motors receive the full electromotive force generated by armature 11. In position $c$, the motor armatures are connected in series across source S, and thus receive directly the full electromotive force of source S. The electromotive force of source S may be substantially equal to the maximum electromotive force of the armature 11, or may exceed it to some degree so that in passing from position $c^1$ to position $c$, the load will be taken by source S. In passing to position $d$, the counter-electromotive force of armature $M^1$ is gradually reduced by weakening its field, and in position $d$, armature $M^2$ is connected directly across source S and receives its full electromotive force. In position $e$, the two motor armatures are connected in parallel across source S, each motor having full field strength. In passing to position $f$, the connections of the motor armatures are changed and are connected in series with the armature 11 and in parallel with each other across source S. In position $f$, the field 12 has its resistance $R^3$ in circuit, and the weak field thus created causes the armature 11 to generate a low electromotive force, and in the same direction as that of the source so that in this position, the two motor armatures in parallel receive the electromotive force of the source S plus that generated by armature 11, and thus giving an increased speed. The field 12 is afterward gradually strengthened so that in position $g$, the motors receive the electromotive force of source S plus the full electromotive force of armature 11. Further movement of the controller weakens the fields $F^1$, $F^2$ of the motors, and so gives greater increase in speed.

Figure 7:
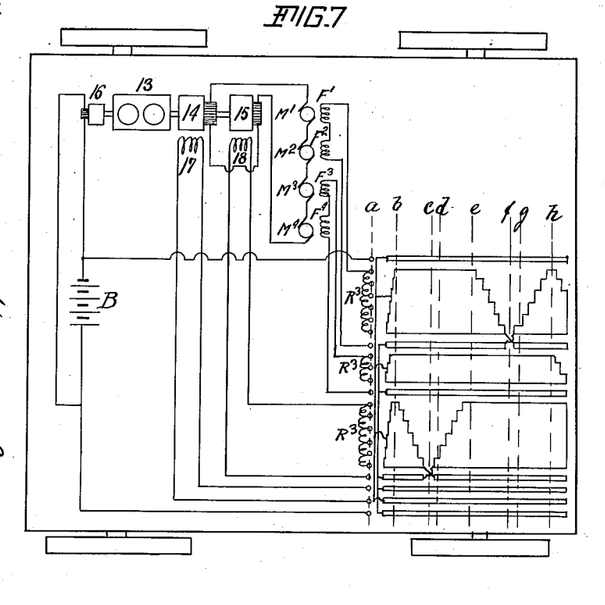
Fig. 7 is a diagram showing another form of my invention shown as applied to a motor vehicle.

In Fig. 7, one form of my invention is shown applied to the operation of a motor vehicle. The vehicle carries a prime mover 13, such as an engine of any desirable form, and this drives two generators 14, 15 for controlling the energy supplied to the motors, and the prime mover also drives an exciter 16, which has a storage battery B associated therewith. The field 17 of the armature 14 is maintained at substantially constant strength, but the field 18 of the armature 15 is controllable and varied in strength and direction. The operation will be understood by considering the successive positions of the controller. In position $b$, the motor fields have their full strength and the field 18 is also at full strength, but its direction is such that the electromotive force generated by armature 15 is opposite in direction to that generated by armature 14, and these electromotive forces are nearly equal. The resultant electromotive force which is applied to the motor armatures shown connected in series is therefore low. As the controller is moved, resistances will be inserted in the circuit of the field 18, and by thus weakening this field, the opposing electromotive force generated by armature 15 is gradually reduced and the resultant electromotive force applied to the motors is gradually increased. In position $c$, the field circuit of armature 15 is open and substantially no electromotive force is generated thereby so that the armatures $M^1$, $M^2$, $M^3$ $M^4$ of the motors receive the full electromotive force of armature 14. Movement of the controller next reverses the direction of field 18, and in position *d* this field has low strength in the reversed direction. The armature 15 therefore generates a comparatively low electromotive force in the same direction as armature 14. The motor armatures therefore receive the full electromotive force of armature 14 plus the low electromotive force generated by armature 15, with a consequent increase in speed. The field 18 is gradually strengthened until at position *e*, the motors will receive the full electromotive force of armatures 14, and 15. Now, in order to obtain a further increase in speed, the fields of armatures $M^1$, $M^2$ are gradually reduced in strength by inserting resistance in their field circuits, and at position *f*, the motor armatures $M^3$, $M^4$ receive substantially the full electromotive force of the armatures 14, 15. By further movement of the controller, the motors $M^1$, $M^2$ are transformed into generators, being driven by the load, and in position *g*, these armatures are generating a low electromotive force in the same direction as that of the sources 14, 15 so that the electromotive force applied to the armatures $M^3$, $M^4$ is further increased. In position *h*, the armatures $M^3$, $M^4$ receive the full electromotive force of armatures $M^1$, $M^2$ in addition to that of the sources 14, 15. In the final positions of the controller, the field strength of armatures $M^1$, $M^2$, $M^3$, $M^4$ is weakened, giving correspondingly higher speeds.

Figure 8:
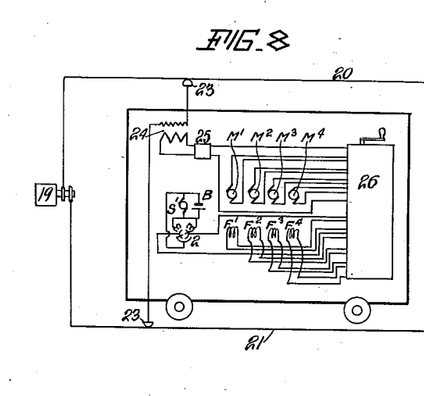
Fig. 8 is a diagram illustrating the application of the form of invention shown in Fig. 1 to a railway system.

In Fig. 8, the form of my invention referred to in connection with Fig. 1 is shown applied to a single phase alternating current system. The single phase source is indicated at 19, which is connected to the supply leads or mains 20, 21. A vehicle is indicated at 22, and current is lead to and from the vehicle by means of sliding contacts 23, 23. The supply mains may be of high electromotive force, and when received on the vehicle may be transformed to comparatively low electromotive force by means of the transformer 24. From the secondary of the transformer, the current may be led to any desirable form of rectifier 25, which will correspond to the source S of Fig. 1. The propelling motor armatures and their field windings are designated by characters similar to those used in Fig. 1, and it will be seen by following the connections that they correspond and are in the same order as those of Fig. 1. The controller is indicated generally by the reference character 26.

Figures 9, 10, 11, 12, 13:
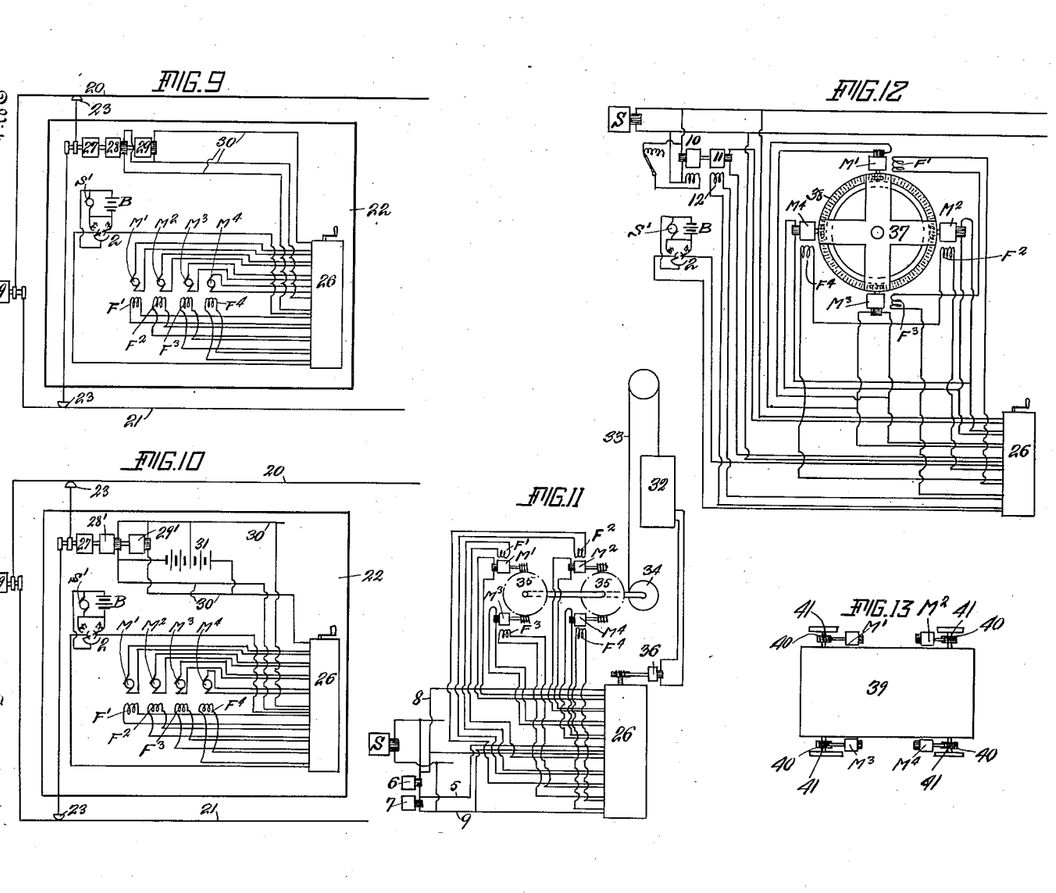
Fig. 9 is a similar diagram showing the application of the form of Fig. 2 to a railway system.
Fig. 10 is a similar diagram showing the application of the form of Fig. 4 to a railway system.
Fig. 11 is a diagram showing the application of one form of my invention to the control of an electric elevator.
Fig. 12 is a diagram showing the application of one form of my invention to the control of a common load, such as a turret or gun carriage in which it is desirable to obtain refinement of control at low speeds particularly.
Fig. 13 is a diagram indicating a desirable arrangement of four motors upon a truck vehicle.

In Fig. 9, a somewhat similar railway system is indicated, but in this case the energy derived from the line is used to operate a motor generator, comprising the alternating current motor 27 which drives the direct current generators 28, 29. These may generate electromotive forces of the same value, and when interconnected as shown will supply energy to the three-wire mains 30, the intermediate wire being half way between the potential of the outside wire. The motors are operated from this three wire source, and their speed is varied in the manner described with reference to Fig. 2.

In Fig. 10, the arrangement is somewhat similar to that of Fig. 9 except that instead of having generators 28, 29 of the same potential, the generators $28^1$, $29^1$ of Fig. 10 have different potential. The relative electromotive forces may be as referred to in connection with Fig. 4, that of generator $29^1$ being say 100, that of $28^1$ being 200, and the total across the outside supply mains 30 being 300. I have shown the battery 31 connected across these mains, and which may aid the generators in carrying the maximum load, or in some instances the battery may be used by itself for supplying the different electromotive forces. The connections to controller 26 are the same as that of Fig. 4, and their mode of operation will consequently be the same.

In Fig. 11, an application of one form of my invention is shown to the control of an elevator. The car is indicated at 32, and its movement is controlled by the cable 33 which passes around the working drum 34. On the shaft of the drum 34 are indicated two gears 35, 35 each driven by two worm shafts of two electric motors oppositely arranged as indicated. The source of electric energy is indicated at S, and by means of the balancers 6, 7 there is derived the three wire mains 8, 5, 9 and it is assumed that the relative electromotive forces are in the ratio of 100, 200, 300 as referred to in Fig. 4. The connections of the propelling motors and of the sources to the controller 26 are the same as in Fig. 4, and the same mode of operation is secured. The controller is indicated in this instance as being driven by the pilot motor 36, which may be controlled in speed and direction of rotation from the car in any suitable manner.

In Fig. 12, one form of my invention is shown applied to the operation of a turntable, turret, gun-carriage and similarly operated devices. The movable part is indicated generally by the character 37, having a circular rack 38, which is engaged by the driving gears on four motors spaced 90 degrees apart, and which act in unison to turn the load. The method of controlling the motors is the same as that referred to in connection with Fig. 6, and the connections of the sources and motors correspond thereto. In an application to devices of the character referred to, it is very important to obtain fine control of the speed of the motors at low speeds in order to secure the exact positions of the parts desired.

In Fig. 13, a four-wheeled truck or vehicle is indicated at 39, and on the shaft of each wheel, each of which is assumed to move freely with reference to the others, is mounted a gear 40, driven by a worm 41. Each worm is driven independently by its own motor, and the motors are arranged at the sides of the truck as is indicated in the drawing. The motors may be connected in any desirable manner, but I have indicated the motors M¹, M³ of the previous drawing as being paired off on the forward pair of wheels, and in those cases where the motors M¹, M³ act as generators or boosters, the motors M², M⁴ on the rear wheels will act as the propelling motors and thus obtain greater tractive effort.

It will be noted that in passing through the different running positions and intermediate positions, the connections made by the controllers above described are such that there is no interruption of the working current of the motors from the main source. This is accomplished by short circuiting the motor armatures and other parts, by maintaining certain motor connections while new connections are made with other motor armatures, etc. This very advantageous result which may be secured by my invention aids in securing gradual control of the load without abruptness, and also practically prevents sparking at the controller contacts.

Although I have indicated a form of controller in each embodiment of my invention in the preceding description, it will be understood that the controllers may be of various other forms, such as electro-magnetic switch control, and that the contacts and intermediate connections in passing to the various running positions may also be differently and variously arranged. Also some of the connections for certain running positions may be omitted and others may be added and still be within the scope of my invention. It will also be understood that the usual arrangements may be followed in constructing the controllers, such as providing a magnetic blow-out, means for making the movement of the switch or switches quick-acting, the designation by a pointer of the desirable running position, and other features of construction which may prove desirable in particular instances.

It may sometimes be desirable in obtaining reverse direction of the load, instead of using a reversing switch 2 or reversing the motor armature connections as above referred to, to reverse the source S¹; also instead of varying the resistance in the field circuits of the motors for controlling their strength, the source or sources used for exciting the fields may be made variable in electromotive force and thus apply varying electromotive forces to the field circuits of the motors.

It will be understood that for control of a number of vehicles forming a train, or for controlling any number of units from any one point, or from any desired different location, that any desired form of multiple unit control may be used in connection with my invention.

Having thus described my invention, I declare that what I claim as new and desire to secure by Letters Patent, is,—

1. The combination of means for developing different electromotive forces, a plurality of electric motors operating to drive a common load, and means for supplying to the motors as a group different electromotive forces from said first named means and for varying the relative electromotive forces upon said motors for varying the speed of the driven device.

2. The combination of means for developing different electromotive forces, a plurality of electric motors operatively connected to a common load, and means for applying to the motors as a group different electromotive forces from said first named means and for varying the field strength of one of said motors to vary the speed of the driven device.

3. The combination of a plurality of electric motors driving a common load, the motors delivering their driving effort to the common load at different locations, and means for varying the speed of the driven device by varying the electromotive force of one of said motors while maintaining the relative speeds of the motors constant, and for developing different electromotive forces in series with the motors as a group.

4. The combination of two motors which are mechanically related to the same driven device, and means for varying the speed by varying the electrical performance of one of said motors while maintaining the same connection of the motor armatures, and for supplying to the motor armatures energy developed at different electromotive forces.

5. The method of varying the speed of a driven device to which a plurality of electric motors are mechanically connected, which consists in supplying to the motor armatures energy developed at different electromotive forces, and varying the electromotive force on one armature relatively to that on another.

6. The method of retarding a moving load which consists in driving two dynamo electric machines through different driving connections, and varying the torque required to drive one of said machines relatively to that required to drive the other.

7. The method of accelerating and retarding a load, to which two dynamo electric machines are operatively connected, which consists in varying the relative motor torques of said machines while accelerating, and varying the relative generator torques of said machines while retarding.

8. The combination of sources of different electromotive force, two electric motors acting on a common load, and means for connecting the armatures of both motors across said different sources of electromotive force while keeping the connections of said sources unchanged.

9. The combination of sources of different electromotive forces, two electric motors acting on a common load, and means for connecting said motors to said different sources of electromotive force while driving said load at the same speed.

10. The combination of two different sources of electromotive force, two electric motors acting on a common load, and means for connecting one of said motors to one of said sources and at the same time connecting the other of said motors to the other of said sources.

11. The combination of two sources of different electromotive forces, electric motors acting on a common load, and means for transferring the load on one or more of said motors when connected to one of said sources to other of said motors connected to the other of said sources.

12. The method of varying the speed of a driven device which consists in operating said device by a plurality of electric motors, connecting said motors to a source of low electromotive force, connecting certain of said motors to a source of higher electromotive force, and finally connecting all of said motors to said source of higher electromotive force.

13. The combination of a plurality of motors acting on a common load, a source of constant electromotive force, a variable source of electromotive force, and means for connecting said motors to said sources for varying the speed of said load.

14. The combination of a plurality of motors acting on a common load, means for varying the speed by varying the electromotive force of the energy delivered to them jointly, and means for varying their speed by varying the relative electromotive forces on the armature terminals.

15. The method of accelerating a plurality of electric motors which consists in increasing the electromotive force of the source which supplies energy to the motors, and then varying the relative electromotive forces applied to the motors.

16. The combination of a plurality of electric motors acting on a common load, two sources of electromotive force, and a single controlling means for connecting said motors to one of said sources and gradually increasing the electromotive force applied to certain of said motors, then connecting one or more of said motors to the other of said sources, and then increasing the electromotive force applied to all of said motors.

17. The method of controlling the speed of a plurality of motors which are mechanically connected to a common load, which consists in varying the relative counter-electromotive forces of certain of the motors by exciting a field winding of certain of the motors by a current independent of its armature current, and varying said field exciting current.

18. The method of varying the speed of a plurality of motors which are mechanically connected to a common load, which consists in connecting the motor armatures in series with each other, supplying the motor armatures with energy from one source of electromotive force, gradually increasing the electromotive force applied to the motors to the electromotive force of another source, supplying energy to the motors from said two sources jointly, and then supplying energy to the motors from said other source separately.

19. The method of controlling the common speed of a plurality of motors which are mechanically connected to a common load, which consists in connecting a motor winding of each of said motors in series with each other, supplying energy to the motors from one source, increasing the electromotive force of said source, and then supplying energy to the motor armatures from a second source of suitable electromotive force in place of said first source.

20. The method of controlling the common speed of a plurality of motors which are mechanically connected to a common load, which consists in supplying energy to the motors from one source, increasing the electromotive force of said source, then supplying energy to the motor armatures from a second source of suitable electromotive force in place of said first source, and dividing the total energy unequally between the motors.

21. The method of varying the common speed of a plurality of motors which are mechanically connected to a common load, which consists in connecting the armatures of certain of the motors in parallel with each other and connecting the armatures of certain others of the motors in series with each other, simultaneously supplying current to all of said motors when so connected, and varying the field strength of at least certain of the motors.

22. The method of controlling a plurality of motors acting on a common load, which consists in supplying current of a certain amount to certain of the motors and supplying a current of different amount to certain of the motors, and varying the relative strengths of the said currents.

23. The method of controlling four electric motors acting on a common load, which consists in connecting corresponding windings of each of the motors in series with each other, then connecting two of said windings in parallel with each other and in parallel with two of said windings in series with each other, then connecting all of said windings in parallel with each other, supplying current to said windings when connected as above, and varying the field strength of the motors.

24. The method of controlling the current in a plurality of electric windings, which consists in generating unidirectional energy of different electromotive forces at two sources of electric energy respectively, connecting said windings in series and in parallel with each other across one of said sources, and then connecting said windings in series and in parallel with each other across the other of said sources.

25. The method of controlling a plurality of electric windings, which consists in connecting said windings in series and in parallel with each other across a source of electromotive force, then connecting said windings in series and in parallel with each other across a source of different electromotive force, and varying the watts taken by certain of said windings relatively to the watts taken by others of said windings.

26. The method of controlling the effect of a plurality of electromagnetic windings, which consists in connecting a plurality of said windings in series with each other across a source of constant electromotive force, reducing the electromotive force upon certain of said windings and increasing the electromotive force upon other of said windings, disconnecting said windings upon which the electromotive force is reduced, and connecting said windings in parallel with said windings upon which the electromotive force is increased.

27. The method of controlling a plurality of electric motors, which consists in energizing a field winding of each of the motors by a current independent of its armature current, varying certain of said field currents for varying the relative duty of the armatures while the armatures are in series with each other and also while the armatures are in parallel with each other.

28. The method of controlling a plurality of electromagnetic windings, which consists in connecting said windings in series and in parallel across one source of electromotive force, then connecting said windings in series and in parallel across a different source of different electromotive force, and then connecting said windings in series and in parallel across a different source of another different electromotive force.

29. The method of controlling a plurality of electric motors, which consists in connecting the motor armatures in series and in parallel successively across a plurality of sources of electromotive force, and controlling the magnetic field of certain of the armatures by varying a field current independently of the armature current.

30. The method of increasing the speed of a pair of motors acting on a common load, which consists in subjecting the armatures in parallel to a source of constant electromotive force, removing one armature from circuit, increasing the field strength of said armature thereby increasing its electromotive force, connecting said armature across a higher constant electromotive force, transferring the load to said armature, disconnecting the other armature, increasing the field strength of said other armature, and connecting said other armature in parallel with the armature across the higher electromotive force.

31. The method of controlling four motors, which consists in connecting four armatures in series, then three armatures in series, then two armatures in series, then connecting two groups in parallel, each group having two armatures in series, then varying the electromotive force on one of the armatures of each group, and finally connecting said four armatures in parallel with each other.

32. The method of controlling a plurality of electric motors, which consists in supplying multiple voltages in series with each other, and connecting the motor armatures in series and in parallel across the different voltages.

33. The method of progressively increasing the speed of a plurality of motors, which consists in connecting the motor armatures across mains of progressively increasing voltages, and varying the field strength of certain of the motors for varying the relative duty of the armatures whereby the change in connection may be made without objectionable change in speed or work performed.

34. The method of operating a plurality of motors, which consists in supplying currents independently to the armature windings and to the field windings, varying the strength of the field currents relatively to each other, and varying the connections of the armatures relatively to each other.

35. The method of operating a plurality of electric motors acting on a common load, which consists in supplying energy to the motors when in parallel across a constant electromotive force circuit, and afterward supplying energy to certain of said motors across a higher constant electromotive force circuit while continuing to simultaneously supply energy to certain of said motors across said first named circuit.

36. The method of controlling a plurality of electric motors acting on a common load, which consists in supplying field exciting currents in parallel with each other and varying the strength of the currents, and supplying armature currents in series, in multiple series, and in multiple.

37. The method of controlling a plurality of motors, which consists in supplying current to the armatures of said motors when in series from a source of electromotive force, increasing the electromotive force of said source to increase the speed of the motors, and supplying the armatures with current from said source and from another source of electromotive force when the electromotive forces of said two sources are approximately equal.

38. The method of retarding the speed of a plurality of motors acting on a common load, which consists in connecting the motor armatures progressively across sources of lower electromotive forces for causing said motors to act in unison to generate retarding electric energy, and connecting said motors in parallel and in series.

39. The method of decreasing the speed of a plurality of motors, which consists in progressively connecting certain windings of the motors across sources of progressively lower electromotive forces whereby certain of the windings generate electric braking energy, and causing said generated energy to be generated unequally by said windings.

40. The method of controlling a plurality of electric motors, which consists in varying the field exciting current of certain of said motors, varying the connections of certain of the motor armatures relatively to each other, and connecting certain of the motor armatures across sources of different constant electromotive forces, whereby the speed of the motors as a whole is progressively varied.

41. The method of operating motors acting on a common load, which consists in supplying current at a certain voltage to one motor armature in a field of certain strength, and supplying current to another motor armature at a lower voltage in a field of less strength, whereby the counter electromotive forces of the motors are properly proportioned to the electromotive forces impressed upon them respectively.

42. The combination of a plurality of electric motors acting on a common load, a plurality of sources having different electromotive forces respectively, and means for connecting corresponding windings of the motors to said sources having different electromotive forces simultaneously.

43. The combination of a plurality of electric motors mechanically connected to a common load, a plurality of sources of constant but different electromotive forces, means for connecting the armatures of said motors to said different sources, and means for energizing the field windings of certain of said motors independently of the armature current.

44. The combination of a plurality of mechanically connected electric motors, means for developing different electromotive forces, means for exciting the field winding of certain of said motors by current independent of the motor armature current, means for varying the relative field strengths of certain of the motors, for connecting certain of the motor armatures in series and in parallel with each other, and for connecting the motor armature circuits to said first named means for applying different electromotive forces to said circuits.

45. The combination of a plurality of sources of constant but different electromotive forces, a plurality of electric motors mechanically connected so as to have a common speed, means for connecting all the motor armatures to either source and for simultaneously connecting certain of said armatures to one of said sources and certain other of said motor armatures to another of said sources.

46. The combination of two sources of different constant electromotive forces, a plurality of motor windings, means for connecting said windings across either of said two sources for causing them to act in unison across either of said sources and also for connecting said windings simultaneously across said two sources for causing the windings to act in unison when connected across both of said sources simultaneously.

47. The combination of a plurality of motor acting on a common load, and means for connecting said motors in series, connecting certain of the motors in parallel and for causing certain of the motor armatures to generate current to retard the load.

48. The combination of a plurality of electric motors geared to a common load, means for progressively increasing and decreasing the speed and for generating a braking current during decrease of speed independently of the use of armature resistance during said changes in speed, said means comprising two stationary sources of different electromotive force for supplying current to the motor armatures.

49. In a railway system, a stationary source of electric energy, conductors leading therefrom, moving contacts for leading the energy upon a moving vehicle, means on the vehicle for producing a multiple voltage system, a plurality of propelling motors, and means for connecting at least one element of the motors in series and in parallel across different voltages of said multiple voltage system.

50. In an electrically propelled vehicle, means for producing a plurality of electromotive forces by magnetic induction, a multiple voltage system of conductors on the vehicle, a plurality of electric motors mechanically connected to the vehicle for propelling the same, and means for connecting at least one element of a plurality of motors in series and in parallel across a plurality of the voltages of said multiple vlotage system.

51. In an electrically propelled vehicle, the combination of two electromotive force producing windings on said vehicle, the electromotive forces of said windings being different, a plurality of propelling motors, means for connecting certain windings of said motors in series and in parallel across the said two electromotive force producing windings for controlling the movement of the vehicle.

52. A stationary alternating current source of energy, an electrically propelled vehicle supplied with energy therefrom through moving contacts, means on the vehicle for developing a plurality of different voltages, a plurality of propelling motors, and means for connecting one element of certain of the motors across the different voltages for controlling the movement of the vehicle.

53. In a motor control system, a plurality of electric motors acting on a common load, and means for connecting a plurality of the motor armatures in series and in parallel across mains of different voltages, and for varying the relative field strengths of certain of the motors.

54. The combination of a plurality of electric motors to be controlled as a group, each motor having two electromagnetic windings, means for connecting a plurality of the windings in series and in parallel to a source while preserving unaltered the connection of the other windings, and means for varying the currents in the latter windings.

55. The combination of a plurality of electromotive force producing windings, a plurality of electromotive force producing energy absorbing devices, means for varying the relative electromotive forces of said devices, and means for connecting said devices in series and in parallel across the different electromotive force producing windings.

56. The combination of a plurality of electric motors and means for progressively increasing the speed of said motors, said means comprising a multiple voltage system, an electromotive force producing winding, means for causing said winding to produce a controllable and variable electromotive force for varying the electromotive force supplied to the said motors, and means for connecting certain of said motor windings in series and in parallel.

57. The combination of a high tension source of electric energy, a moving vehicle supplied with energy therefrom through moving contacts, a multiple voltage system derived from said source and carried by the vehicle, a plurality of propelling motors, and means on the vehicle for connecting the windings of the said motors across different voltages of said system and for transferring said windings from one voltage to a higher voltage without the employment of resistances in series with said windings.

58. The combination of four electric motors, means for connecting the motor armatures in series with each other and the field windings in parallel with each other, and for varying the speed of the motors as a group comprising means for varying the relative strengths of currents in said windings and for connecting certain of the motor armatures in parallel with other motor armatures.

59. The combination of a source of electric energy, four electromotive force producing windings, and a controller for connecting said four devices in series, then disconnecting one leaving three in series, then disconnecting another leaving two in series, then connecting the disconnected devices in series with each other and in parallel with the other two devices in series, and then connecting all four in parallel.

60. The combination of four electric motors, and controlling means for varying the relative connections of certain of the motor armatures and varying the relative field strength for certain of the motor armatures, the said fields being energized by currents independent of the armature current.

61. The combination of means for developing different electromotive forces, a plurality of electric motors, and a single controller for connecting a plurality of windings of said motors in series and in parallel with each other and for subjecting the circuits of said windings to said different electromotive forces.

62. The combination of means for developing two different electromotive forces in series with each other, a plurality of electric motors, and a single controller for connecting corresponding windings of said motors in series and in parallel relation with each other and across each of said different electromotive forces.

63. The combination of a source of variable electromotive force, a source of constant electromotive force, an electric motor, and a single controller for connecting the motor armature to the source of variable electromotive force, for varying the electromotive force of said variable source, for connecting the motor armature to said source of constant electromotive force, and for weakening the field strength of the motor.

64. The combination of a source of variable electromotive force, a plurality of electric motors, and means for connecting the motor armatures in series with said source, for varying said source and for affecting the electrical performance of the motors to divide the total load unequally.

65. The combination of means for developing different voltages, a plurality of electric motors, and controlling means for causing the motors to divide the total load equally and also unequally and for subjecting the motors to said different voltages.

66. The method of accelerating and retarding a load to which two dynamo electric machines are operatively connected, which consists in varying the relative duties of the machines while causing their joint action to produce an accelerating effort upon the load, and varying the relative duties of the machines while causing their joint action to produce a retarding effort upon the load.

67. The combination of a plurality of dynamo electric machines acting on a common load and means for varying their relative duty during acceleration and during retardation, whereby their joint action causes the acceleration and the retardation of the load.

68. The combination of two dynamo electric machines which are mechanically related to the same driven device, and means for varying the speed by varying the electrical performance of at least one of said machines, while maintaining the same connection of the armatures of the machines, and for supplying to at least one of the armatures energy developed at different electromotive forces.

69. The method of controlling the speed of a plurality of dynamo electric machines which are operatively connected to a common load, which consists in varying the relative duties of certain of the machines by separately exciting a field winding of at least one of the machines and varying said field exciting current.

70. The method of controlling a plurality of dynamo electric machines acting jointly on a common load, which consists in supplying current of a certain amount to one of the machines and supplying a current of different amount to another of the machines, and varying the relative strengths of the currents.

71. The method of operating a plurality of electric motors acting on a common load, which consists in supplying energy to the motors across a certain electromotive force, and afterward supplying energy to certain of the motors across a higher electromotive force while continuing to simultaneously supply energy to certain of said motors across said first named electromotive force.

72. The combination of a plurality of sources of constant and different electromotive forces, a plurality of electric motors mechanically connected so as to have a common speed, and means for simultaneously connecting certain of said motor armatures to one of said sources and certain other of said motor armatures to another of said sources.

73. The combination of a plurality of motors acting on a common load, and means for varying the relative duties of the motors and thereby dividing the total load at different speeds and for causing a certain winding of one of the motors to generate current to retard the load.

74. A stationary source of alternating current energy, a plurality of motors operatively connected to a common load, and means for operating said motors so as to vary their relative duties in dividing the common load and thereby to vary the speed of the common load.

75. A stationary source of alternating current energy, a plurality of motors operatively connected to jointly drive a common load, and means comprising sources of different electromotive forces for changing the relative duties of the motors in dividing the common load and thereby changing the speed of the common driven load.

76. The combination of a high tension source of electric energy, a moving vehicle supplied with energy therefrom through moving contacts, a multiple voltage system supplied from said source and carried by the vehicle, a plurality of propelling motors, and means on the vehicle for connecting the winding of said motors across the different voltages of said system and for transferring said windings from one voltage to a higher voltage.

77. The method of operating a plurality of electric motors mechanically connected to drive a common load, which consists in developing a plurality of independent different voltages and simultaneously impressing said independent voltages upon different motors.

78. The method of operating a plurality of electric motor windings mechanically connected to drive a common load, which consists in developing a plurality of independent voltages, supplying certain windings from one voltage and simultaneously supplying certain other windings from the other voltage, and changing the operative duties of certain of the windings relative to certain of the other windings.

79. The method of operating a plurality of electric motor windings mechanically connected to drive a common load, which consists in developing a plurality of independent voltages, supplying a certain winding at one voltage and simultaneously supplying a certain other winding at another voltage, and then varying the voltage applied to one of the windings relative to that applied to the other winding.

80. The method of operating a plurality of electric motor windings mechanically connected to drive a common load, which consists in developing independent voltages supplying two motor windings from said voltages respectively, and open-circuiting one of said windings without open-circuiting the other, whereby the second winding remains operative independently of the inoperativeness of the other.

81. The method of operating a plurality of electric motor windings mechanically connected to drive a common load, which consists in developing two independent voltages, operating part of the tractive wheels by energy supplied from one voltage and another part by energy supplied from the other voltage, whereby operation of each of the two sets of wheels is rendered independent of the slipping of the wheels of the other set.

82. In combination, a plurality of electric motors mechanically connected to drive a common load, means for impressing independent voltages on different motors, and a controller adapted to vary the voltage on one of the motors relatively to that upon another motor.

83. In combination, two electric motors mechanically connected to drive a common load, a source of single phase alternating current, energy transforming means supplied therefrom adapted to produce two independent voltages, and means for simultaneously supplying to said motors, respectively, energy from said two voltages.

84. In combination, two electric motors mechanically connected to drive a common load, a source of single phase alternating current, energy transforming means supplied therefrom adapted to produce two different independent voltages, and means for simultaneously supplying to said motors, respectively, energy from said two voltages.

85. In combination, an electric circuit, a pair of mechanically connected electromotive force producing windings connected in series across said circuit, two motors connected in parallel with said windings respectively, a load operatively connected to both motors, and means for controlling the joint action of the motors for driving the load.

86. A source of alternating current energy, a plurality of motors acting on a common load and operated therefrom, and means for varying the speed of the load, said means comprising means for changing the relative percentages of the total load taken by the motors respectively.

87. A source of alternating current energy, a plurality of dynamo electric machines operated therefrom and operatively connected to drive a common load, means for causing said machines to act jointly to accelerate the load comprising means for dividing the total load unequally between the motors.

88. A source of alternating current energy, a dynamo electric winding adapted to be operated by energy therefrom and operatively arranged to drive a load, a second dynamo electric winding supplied with energy derived from the same original source but of different characteristics from that supplied to the first winding, said second winding acting in an auxiliary manner to assist the first in driving the common load.

In testimony whereof I affix my signature, in presence of two witnesses.

H. WARD LEONARD.

Witnesses:
L. K. SAGER,
GEO. A. HOFFMAN.